J. FLAMMANG.
SPIRAL PISTON RING.
APPLICATION FILED SEPT. 21, 1914.
1,165,084.
Patented Dec. 21, 1915.
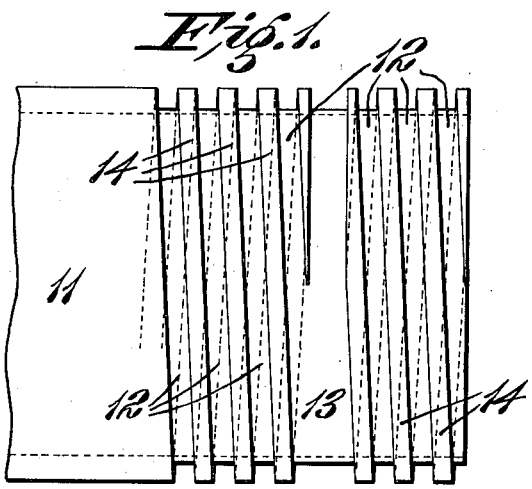
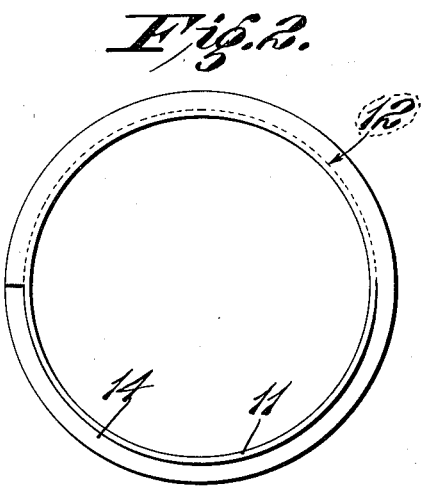
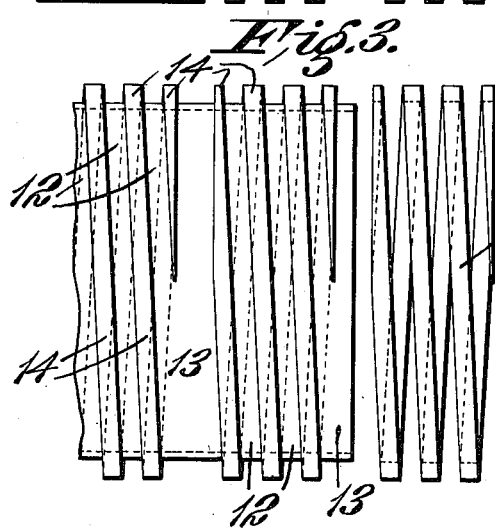
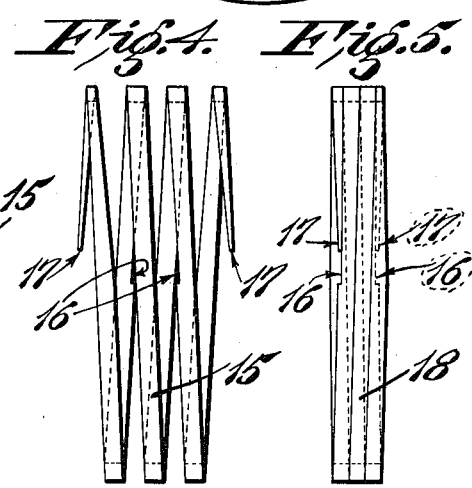
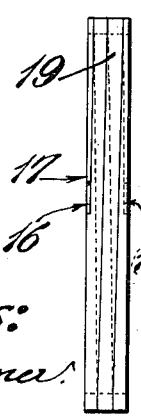
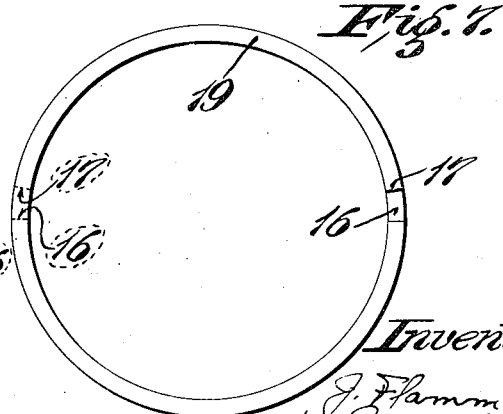
Witnesses:
Edgar T. Farmer
Al M Holcombe
Inventor:
J. Flammang
by Ca H
his Attys.

UNITED STATES PATENT OFFICE.

JOHN FLAMMANG, OF ST. LOUIS, MISSOURI, ASSIGNOR TO INLAND MACHINE WORKS, OF ST. LOUIS, MISSOURI, A CORPORATION OF MISSOURI.

SPIRAL PISTON-RING.

1,165,084.     Specification of Letters Patent.     Patented Dec. 21, 1915.

Application filed September 21, 1914. Serial No. 862,692.

*To all whom it may concern:*

Be it known that I, JOHN FLAMMANG, a citizen of the United States, and a resident of the city of St. Louis and State of Missouri, have invented new and useful Improvements in Spiral Piston-Rings, of which the following is a specification.

This invention relates to flexible metallic rings for packing the pistons of reciprocating engines, and consists in a piston ring having the form of a continuous spiral and in the process of making the same.

Spiral piston rings as heretofore constructed have the disadvantage of permitting leakage between the convolutions of the spiral unless it is tightly held between the side walls of the groove in the piston.

The object of this invention is to produce a piston ring which has a tightly coiled spiral, the convolutions of which are retained in contact with each other and with the cylinder throughout the length of the spiral by the resiliency of the metal of which the ring is made.

Further objects of the invention will appear from the following description of the piston ring and the process of making the same illustrated in the accompanying drawings.

In the drawings, in which like characters designate the same parts in the several views, Figure 1 is a side view of the tubular piece of metal from which the piston rings are formed, showing the first operation of cutting a spiral groove partly completed; Fig. 2 is an end view of the same; Fig. 3 is a side view of the end of the completely grooved tubular piece, and of a spiral ring after it has been separated therefrom; Fig. 4 is a side view of the spiral ring after it has been finished preparatory to being reversed; Fig. 5 is a side view of the same after being reversed; and Figs. 6 and 7 are a side elevation and an end face view, respectively, of the finished piston ring.

The piston ring may be made of any suitable elastic material, such as cast iron or steel. The metal stock is prepared in the form of a tubular blank 11 with its outside diameter slightly greater than the diameter of the cylinder for which the piston ring is intended, and with its inside diameter slightly less than the inside diameter of the finished ring. This tubular blank may be of a convenient length sufficient to form several piston rings. The tubular blank is mounted in a lathe or other suitable machine, and its periphery is formed with a spiral groove 12 of as many turns as the number of convolutions which it is desired that the piston ring shall have. The depth of this groove is slightly greater than the thickness of the finished ring. The spiral groove 12 intersects an annular groove 13 and runs out into the latter at a point which is diametrically opposite the point where the groove starts, as shown in Fig. 1. The tubular blank may be provided with a series of spiral grooves 12 and annular grooves 13 in alternation, as shown in Fig. 3, forming a series of spiral ribs 14 spaced apart for its entire length. The annular grooves as shown in the drawings are of the same depth as the spiral grooves, but if desired these grooves may be made deeper so as to sever the tubular blank into a series of open spiral coils. Next, the tubular blank 11 is bored out to approximately the inside diameter which is desired for the finished piston ring. This operation cuts away the metal at the bottoms of the grooves 13 and the inner periphery of the spiral ribs 14 and divides up the tubular blank into a number of separate open spiral coils 15. In Fig. 3 the right hand spiral coil 15 has been bored out and separated from the blank 11. About one turn from each end of the spiral, diametrically opposite the points where the width of the helical convolutions starts to become narrower, or taper off, shallow notches 16 are filed on the inner side of the end convolutions. These notches extend for about one quarter of a turn toward each other and run out gradually into the helical side faces of the coil. The ends 17 of the spiral coil are filed off square at their extremities, and are bent outwardly at the points where they start to taper so that the outer face of the tapered portion follows a true helical curve to its extremity. The notches 16, formed in the inner face of the end convolutions, are about opposite the extremities of the spiral coil, and have a depth approximately equal to the width of said extremities. These notches are continued beyond the points opposite the extremities for a short distance toward the ends of the spiral, as shown in Fig. 4.

The spiral coil 15 is inverted or turned inside out by passing each convolution progressively from one end 17 through or over the remaining convolutions and continuing the operation until all of the convolutions have been passed through or over the undisturbed portion of the coil. This operation changes the coil from a right hand spiral to a left hand spiral, or vice versa; and changes the coil as a whole from an open spiral 15 to a closed spiral 18 in which the individual convolutions are held by spring tension against separating from those adjacent thereto, as shown in Fig. 5. The force tending to hold the convolutions in contact depends upon the elasticity of the material, the diameter of the coil, and the width of the space between the open coils as originally made.

The closed coil 18 constitutes an annular band having a helical cut extending from end face to end face. The end faces of the coil or band 18 are squared off by means of suitable tools, forming a ring 19 having parallel end faces, as shown in Fig. 6. The end faces and the periphery of the ring may be ground by the usual methods of grinding piston rings of ordinary form. The length of the longitudinal notches 16 in the end faces is sufficient to enable the ends of the spiral to screw around when the ring is compressed into a cylinder, and when compressed into a cylinder the gap between the ends of the spiral and the shoulders at the end of the notches of the adjacent coils will be very small.

It is evident from the preceding description that changes in the dimensions of the spiral can be made to suit the requirements of the uses for which the rings are intended. For example, the resiliency of the spring can be increased and the pressure exerted thereby against the cylinder correspondingly decreased by increasing the number of convolutions; and conversely, the ring can be made stiffer and its pressure against the wall of the cylinder thereby increased by reducing the number of convolutions. Also, the cross-sectional dimensions of the coils can be varied to increase the strength and stiffness of the ring, and vice versa, as will be apparent to persons having a knowledge of engine design.

The invention is not restricted to the precise method of manufacture shown and described, and no claim for the method is made in this application.

What I claim as my invention is as follows:

1. As a separate article of manufacture, a cylindrical piston ring consisting of a closed helix of elastic material in spring contact axially.

2. A piston ring of elastic material consisting of a plurality of convolutions arranged in the form of a helix, adjacent convolutions being in contact throughout their length and subjected to internal stresses tending to retain them in contact.

3. An elastic piston ring of annular form having parallel sides, said ring being split circumferentially on a helical curve, the lapping portions of said ring being held by their own resiliency in close contact with each other throughout their length.

4. An elastic piston ring of annular form having concentric inner and outer cylindrical surfaces and parallel sides, said ring being split lengthwise from side to side along a helical curve, the lapping portions of said ring being held by their own resiliency in close contact with each other throughout their length.

5. An elastic piston ring of annular form having parallel sides, said ring being split lengthwise between points diametrically opposed, the lapping portions of said ring having tapered ends and being held by their own resiliency in close contact with each other throughout their length.

Signed at St. Louis, Mo., this 19th day of September, 1914.

JOHN FLAMMANG.

In the presence of—
  A. M. HOLCOMBE,
  M. A. SHELTON.